(12) United States Patent
Kim

(10) Patent No.: US 10,793,021 B2
(45) Date of Patent: *Oct. 6, 2020

(54) SEAT MOUNTING UNIT FOR VEHICLE

(71) Applicants: Hyundai Motor Company, Seoul (KR); Kia Motors Corporation, Seoul (KR)

(72) Inventor: Do Hoi Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 40 days.

This patent is subject to a terminal disclaimer.

(21) Appl. No.: 16/241,244

(22) Filed: Jan. 7, 2019

(65) Prior Publication Data

US 2020/0108735 A1 Apr. 9, 2020

(30) Foreign Application Priority Data

Oct. 5, 2018 (KR) .................. 10-2018-0118826

(51) Int. Cl.
*B62D 25/20* (2006.01)
*B62D 21/15* (2006.01)
*B60N 2/14* (2006.01)
*B60N 2/005* (2006.01)

(52) U.S. Cl.
CPC ............ *B60N 2/005* (2013.01); *B60N 2/143* (2013.01); *B62D 21/15* (2013.01); *B62D 25/20* (2013.01)

(58) Field of Classification Search
CPC ...... B62D 25/20; B62D 25/15; B62D 25/157; B60N 2/005; B60N 2/14; B60N 2/143; B60N 2/146; B60N 2/015; B60N 2/42736; B60N 2002/022
USPC ............... 296/187.08, 187.12, 68.1, 65.06
See application file for complete search history.

(56) References Cited

U.S. PATENT DOCUMENTS

| | | | | |
|---|---|---|---|---|
| 5,954,390 A * | 9/1999 | Kleinhoffer | ............ | B60N 2/015 296/187.12 |
| 6,299,238 B1 * | 10/2001 | Takagi | ................. | B60N 2/4235 296/187.12 |
| 10,717,374 B2 * | 7/2020 | Kim | ...................... | B60N 2/146 |
| 2002/0167200 A1 * | 11/2002 | Uchida | .............. | B62D 25/2036 296/204 |
| 2005/0179242 A1 * | 8/2005 | Chernoff | ............ | B60N 2/01508 280/781 |
| 2006/0202513 A1 * | 9/2006 | Matsuda | ............ | B60N 2/42736 296/187.12 |

(Continued)

FOREIGN PATENT DOCUMENTS

KR 10-1734575 B1 5/2017

*Primary Examiner* — Gregory A Blankenship
(74) *Attorney, Agent, or Firm* — Mintz Levin Cohn Ferris Glovsky and Popeo, P.C.; Peter F. Corless

(57) ABSTRACT

A seat mounting unit for a vehicle is provided. The unit includes a floor panel that has a panel shape forming a floor surface of the vehicle and includes a load path member protruding from the floor surface and extending in a predetermined direction. The load path member is partially cut and divided through cut portions and a seat mounting part is positioned at the cut portions of the load path member, rotatably installed on the floor panel. The seat mounting part has a side surface portion with a predetermined height and the side surface portion overlaps a side surface of a cut end portion of the load path member in a height direction.

12 Claims, 8 Drawing Sheets

(56) References Cited

U.S. PATENT DOCUMENTS

| | | | |
|---|---|---|---|
| 2008/0315600 A1* | 12/2008 | Fischer | E04F 21/02 294/3.5 |
| 2010/0237659 A1* | 9/2010 | Ishigame | B60N 2/005 296/204 |
| 2012/0019026 A1* | 1/2012 | Deng | B60N 2/42709 296/193.02 |
| 2018/0265136 A1* | 9/2018 | Baccouche | B60N 2/14 |
| 2020/0001747 A1* | 1/2020 | Faruque | B60N 2/933 |
| 2020/0039392 A1* | 2/2020 | Kim | B60N 2/146 |
| 2020/0079246 A1* | 3/2020 | Jaradi | B60N 2/146 |
| 2020/0086769 A1* | 3/2020 | Aktas | B60N 2/3038 |
| 2020/0108735 A1* | 4/2020 | Kim | B62D 25/20 |

\* cited by examiner

SEAT MOUNTING UNIT FOR VEHICLE

CROSS REFERENCE TO RELATED APPLICATION

The present application claims priority to Korean Patent Application No. 10-2018-0118826, filed Oct. 5, 2018, the entire contents of which is incorporated herein for all purposes by this reference.

BACKGROUND

1. Technical Field

The present disclosure relates to a seat mounting unit for a vehicle, and more particularly, to a seat mounting unit for a vehicle that is capable of enabling a vehicle seat to be rotatable and sufficiently absorbing an impact even during a vehicle collision in autonomous vehicles.

2. Description of the Related Art

In the related art vehicle body structure field, many vehicle seats are installed at fixed positions on floor panels. These seats are installed at load path member portions of vehicle body floor structures, and in this state, occupants may move the seats only in a front-back and up-down directions and may not be able to rotate the seats. Meanwhile, in autonomous vehicles, functions of rotating seats are likely to be utilized such that occupants are able to face the back of the vehicle or face each other by rotating seats, during autonomous driving.

However, when a seat of a vehicle in a fixed state is installed on a floor, if a rotary structure is added, a collision load path formed on the floor is disconnected. Thus, in the event of a collision, a collision load may not be sufficiently absorbed to the vehicle body and it may be difficult to ensure stability of the seat. Thus, even in the case of the rotary type seat mounting structure, both functions of rotation and collision absorption through an interaction with the existing floor side road path member are required to be satisfied.

The description provided above as the related art of the present disclosure is merely for helping understanding the background of the present disclosure and should not be construed as being included in the related art known by those skilled in the art.

SUMMARY

An object of the present disclosure is to provide a seat mounting unit for a vehicle, capable of enabling a seat of a vehicle to be rotatable and sufficiently absorbing an impact even during a vehicle collision in autonomous vehicles.

According to an exemplary embodiment of the present disclosure, a seat mounting unit for a vehicle may include: a floor panel having a panel shape forming a floor surface of the vehicle and having a load path member that protrudes from the floor surface and extends in a predetermined direction, the load path member being partially cut and divided through cut portions; and a seat mounting part positioned at the cut portions of the load path member, rotatably installed on the floor panel, and having a side surface portion of a predetermined height, the side surface portion overlapping a side surface of a cut end portion of the load path member in a height direction.

A side surface of the cut end portion of the load path member may have a shape of a closed surface. The floor panel may have a circular aperture formed at a location corresponding to the cut portion of the load path member. The seat mounting part may include a bottom plate coupled to the aperture of the floor panel and a top plate fastened to the bottom plate to rotate relatively with respect to the bottom plate and allowing a lower portion of a seat to be coupled thereto.

The top plate of the seat mounting part may include an upper surface portion allowing the seat to be coupled and a side surface portion that extends downwards along the edge of the upper surface portion and overlapping a side surface of the cut end portion of the load path member. The bottom plate of the seat mounting part may have a circular shape, an edge of the bottom plate of the seat mounting part and an edge of the aperture of the floor panel may be spaced apart from each other by a predetermined distance to form an annular guide slit, and a guide tap may be formed at a lower end of the top plate of the seat mounting part and inserted into the guide slit to be guided during rotation.

A fixing tap may extend outwards from a portion of the edge of the bottom plate of the seat mounting part, the fixing tap may be fixed to the floor panel, and the guide tap may slide along the guide slit and be stopped at the fixing tap. A bearing may be disposed between the top plate and the bottom plate of the seat mounting part, and an annular guide recess may be formed on the bottom plate to allow the bearing to be seated to move thereon.

The top plate of the seat mounting part may include an upper surface portion allowing the seat to be coupled thereto and a side surface portion that extends downwards along the edge of the upper surface portion and overlapping the side surface of the cut end portion of the load path member, a support recess indented downwards may be formed at a portion of the upper surface portion of the top plate, and the bearing may be disposed between a bottom surface of the support recess and the bottom plate. A cross-section of the support recess may have a quadrangular, triangular, or circular shape.

A plurality of load path members may be provided extending in parallel in a predetermined direction. The plurality of load path members may be connected to each other in cut end portions thereof to form a connecting portion, and a side surface of the connecting portion may overlap the side surface portion of the seat mounting part in a height direction. The load path members may include a first path member that extends in a first direction and a second path member that extends in a second direction. Additionally, cut end portions of the first path member and the second path member may be connected to each other to form a connecting portion, and a side surface of the connecting portion may overlap the side surface portion of the seat mounting part in a height direction.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a seat mounting unit for a vehicle according to exemplary embodiments of the present disclosure will be described with reference to the accompanying drawings.

Figure 1:
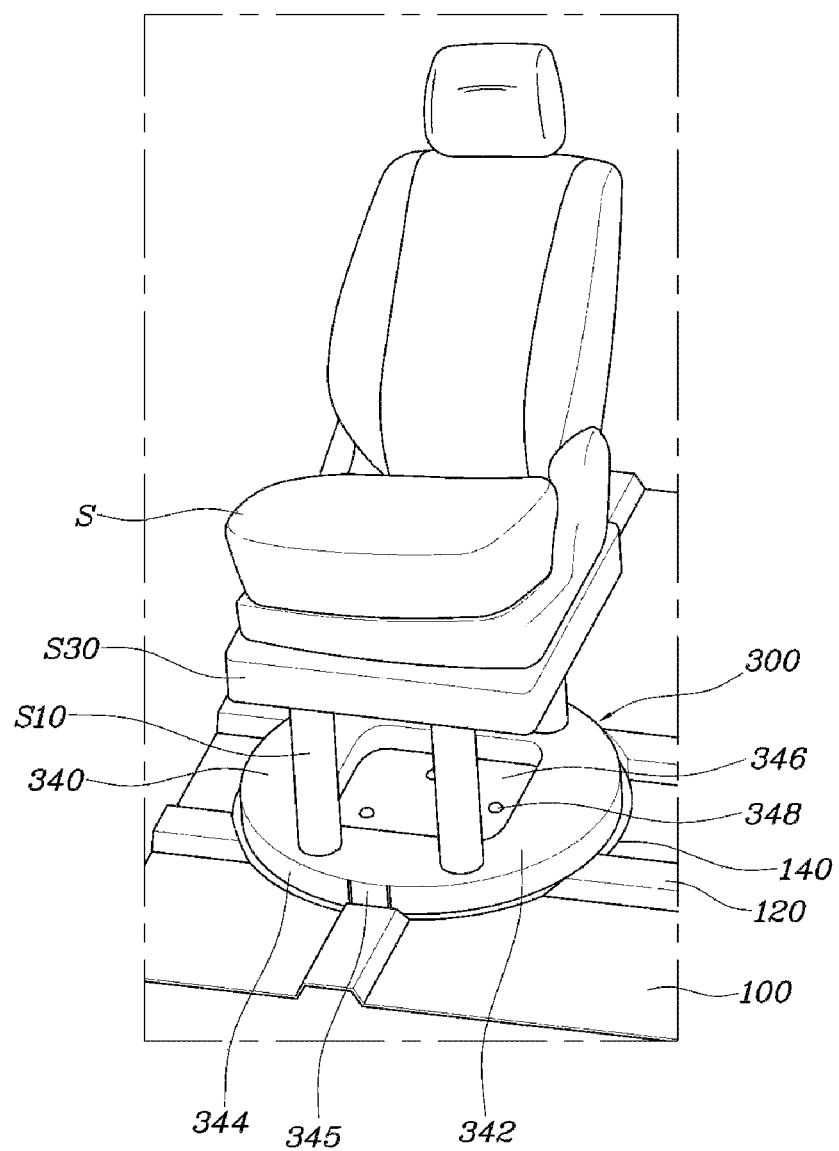
FIG. 1 is a view illustrating a state in which a seat is mounted on a seat mounting unit for a vehicle according to an exemplary embodiment of the present disclosure.
Figure 2:
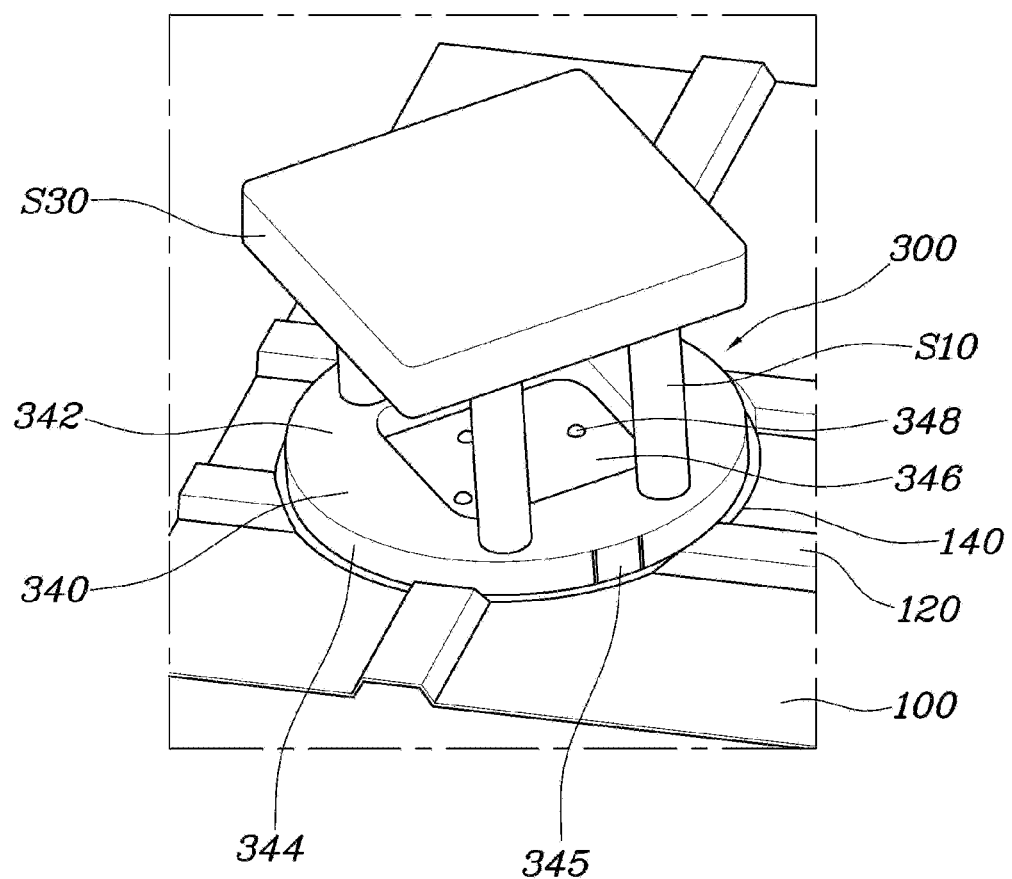
FIG. 2 is a perspective view illustrating a state in which a seat mounting unit for a vehicle is rotated according to an exemplary embodiment of the present disclosure.
Figure 3:
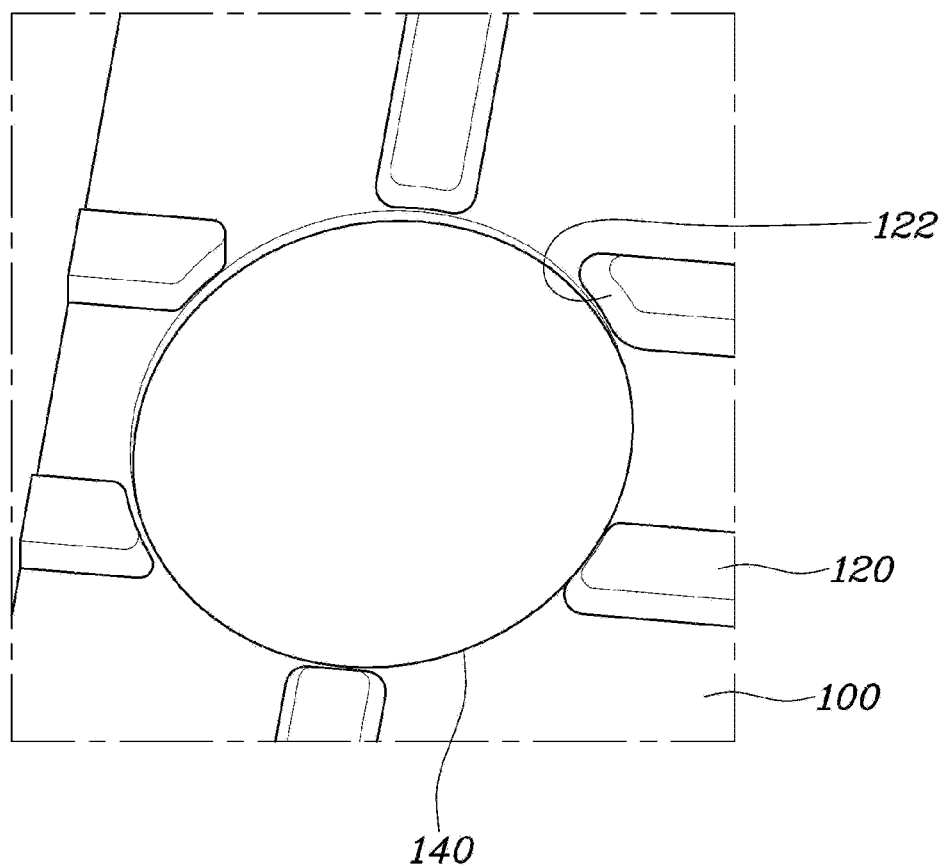
FIG. 3 is a view illustrating a floor panel of a seat mounting unit for a vehicle according to an exemplary embodiment of the present disclosure.

FIG. 1 is a perspective view of a seat mounting unit for a vehicle, FIG. 2 is a perspective view illustrating a rotated state of the seat mounting unit for a vehicle, FIG. 3 is a front view of a floor panel, and FIGS. 4 to 9 are front views. In particular, the seat mounting unit for a vehicle according to the present disclosure may include a floor panel 100 having a panel shape forming a floor surface of the vehicle and having a load path member 120 that protrudes from the floor surface and extends in a predetermined direction, the load path member 120 being partially cut and divided through cut portions 122 and a seat mounting part 300 positioned at the cut portions 122 of the load path member 120, rotatably installed on the floor panel 100, and having a side surface portion 344 with a predetermined height, the side surface portion 344 overlapping a side surface 122 of a cut end portion of the load path member 120 in a height direction.

The floor panel 100 of the present disclosure may include the load path member 120. The load path member 120 may be integrally formed on the floor panel 100 through a press method or a separate member structure may be coupled through welding, or the like. The load path member 120 may protrude upwards or downwards from the floor panel 100. The load path member 120 may be disposed on the floor panel 100 to serve as a frame which spreads and absorbs a collision load during a vehicle collision.

In the present disclosure, the seat mounting part 300 may be disposed between a floor and a seat to rotate the seat. The seat mounting part 300 may be installed to be rotatable on the floor, and the seat of the vehicle may be installed on the seat mounting part 300 as illustrated in FIG. 1. In this state, when the seat mounting part 300 rotates as illustrated in FIG. 2, the seat installed thereon may be rotated together with the floor. When the seat mounting part 300 is installed at an arbitrary location on the floor panel 100 without restriction, when a collision load of the vehicle is applied to the floor panel 100, joint stiffness is low since the seat mounting part 300 is connected to the floor panel 100 through a rotary structure, rather than a fixed structure, and thus, an excessive impact may be transmitted to the seat mounting part 300 to damage coupled portions or the impact may be transmitted to an occupant.

Therefore, in the present disclosure, the seat mounting part 300 may be integrated with the load path member 120 to serve as the load path member 120 and increase joint stiffness of the seat mounting part 300 with respect to the vehicle body, thus ensuring collision safety of the occupant. Specifically, as illustrated in FIG. 3, portions of the load path member 120 are cut, and thus, the load path member 120 of the present disclosure may be divided by the cut portions. In this state, the seat mounting part 300 may be installed to be located in the cut portions 122 of the load path member 120. The seat mounting part 300 may be rotatably mounted on the floor panel 100 to provide a rotational function to the seat. In particular, the seat mounting part 300 may include the side surface portion 344 having a predetermined height, and the side surface portion 344 of the seat mounting part 300 overlaps the side surface 122 of the cut end portion of the load path member 120 in a height direction, thereby connecting the cut load paths.

Figure 7:
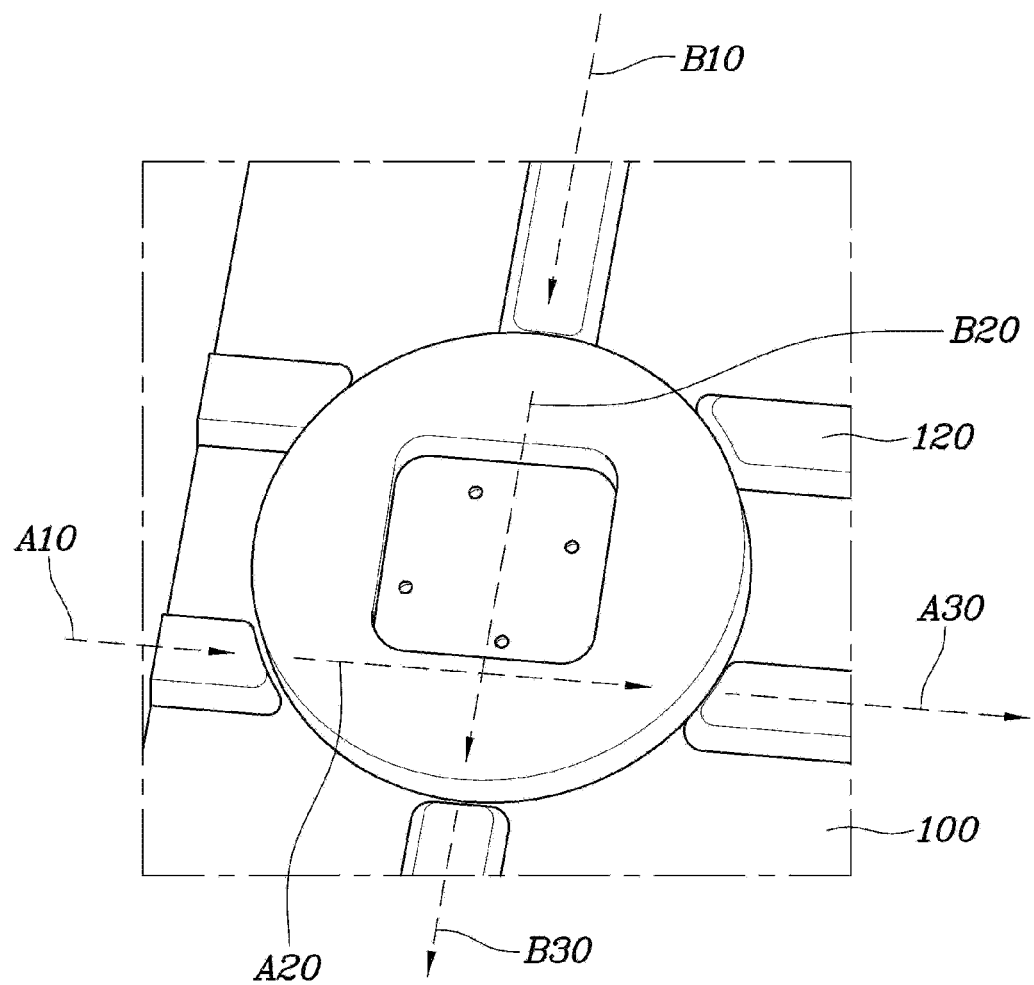
FIG. 7 is a view illustrating a path along which a collision load is transmitted through a seat mounting unit for a vehicle according to an exemplary embodiment of the present disclosure.

FIG. 7 is a view illustrating a path along which a collision load is transmitted through the seat mounting unit for a vehicle according to an exemplary embodiment of the present disclosure, in which a collision load A10 transmitted to one side load path member 120 is transmitted to the seat mounting part 300 through the overlapping side surface portions and a collision load A20 transmitted to the seat mounting part 300 is transmitted as a load A30 to the divided load path member 120 through the overlapping side surface portions. As for a transmission path of the load, FIG. 7 shows that the load may be transmitted through paths A10, A20, and A30 or paths B10, B20, and B30 connecting the load path member 120 and the seat mounting part 300 in FIG. 7.

In other words, the load path member 120 may be divided, the seat mounting part 300 may be installed between the divided parts of the load path member 120, and side surface portions thereof may overlap such that the seat mounting part 300 serves as a load path to prevent a collision load from being broken. Since the seat mounting part 300 may be installed on the load path, a rotation function may be realized and strong joint stiffness of the seat mounting part 300 with the vehicle body may be maintained.

Meanwhile, the side surface 122 of the cut end portion of the load path member 120 may have a shape of a closed surface 122. FIG. 3 is a view illustrating the floor panel 100 of the seat mounting unit for a vehicle according to an exemplary embodiment of the present disclosure. Since the side surface 122 of the cut end portion of the load path member 120 is configured as the closed surface 122, the side surface 122 of the cut end portion of the load path member 120 may be in surface contact with the side surface portion 344 of a top plate of the seat mounting part 300, rather than in line contact therewith, and an overlapping area may be increased. In particular, since an impact may be transmitted through the surface contact, a collision load may be effectively transmitted through the seat mounting part 300 in the load path member 120.

Additionally, as illustrated in FIG. 3, the floor panel 100 may include a circular aperture 140 at a location that corresponds to the cut portion 122 of the load path member 120, i.e., between the cut load path members 120, and a bottom plate 320 of the seat mounting part 300 may be coupled to the location that corresponds to the aperture 140. In the present disclosure, since the seat mounting part 300 for rotating the sheet is to be prepared, a circular space allowing for a rotary structure needs to be secured. By forming the circular aperture 140 in the flow panel 100, the bottom plate 320 of the seat mounting part 300 may be coupled to realize a rotational motion of the seat mounting part 300.

Figure 4:
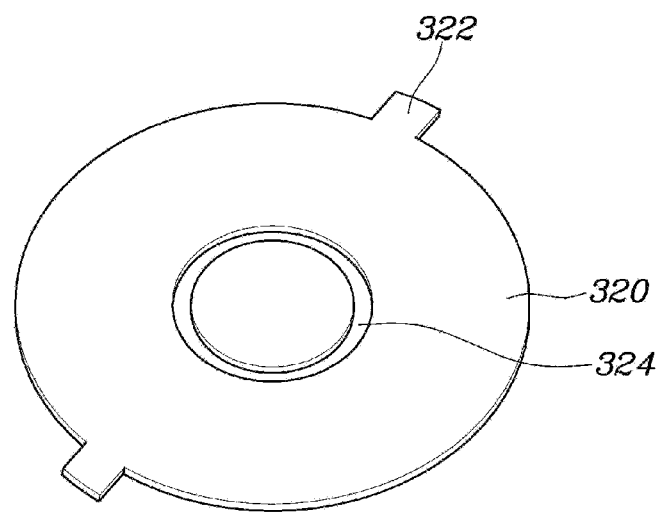
FIG. 4 is a view illustrating a bottom plate of a seat mounting part of a seat mounting unit for a vehicle according to an exemplary embodiment of the present disclosure.
Figure 6:
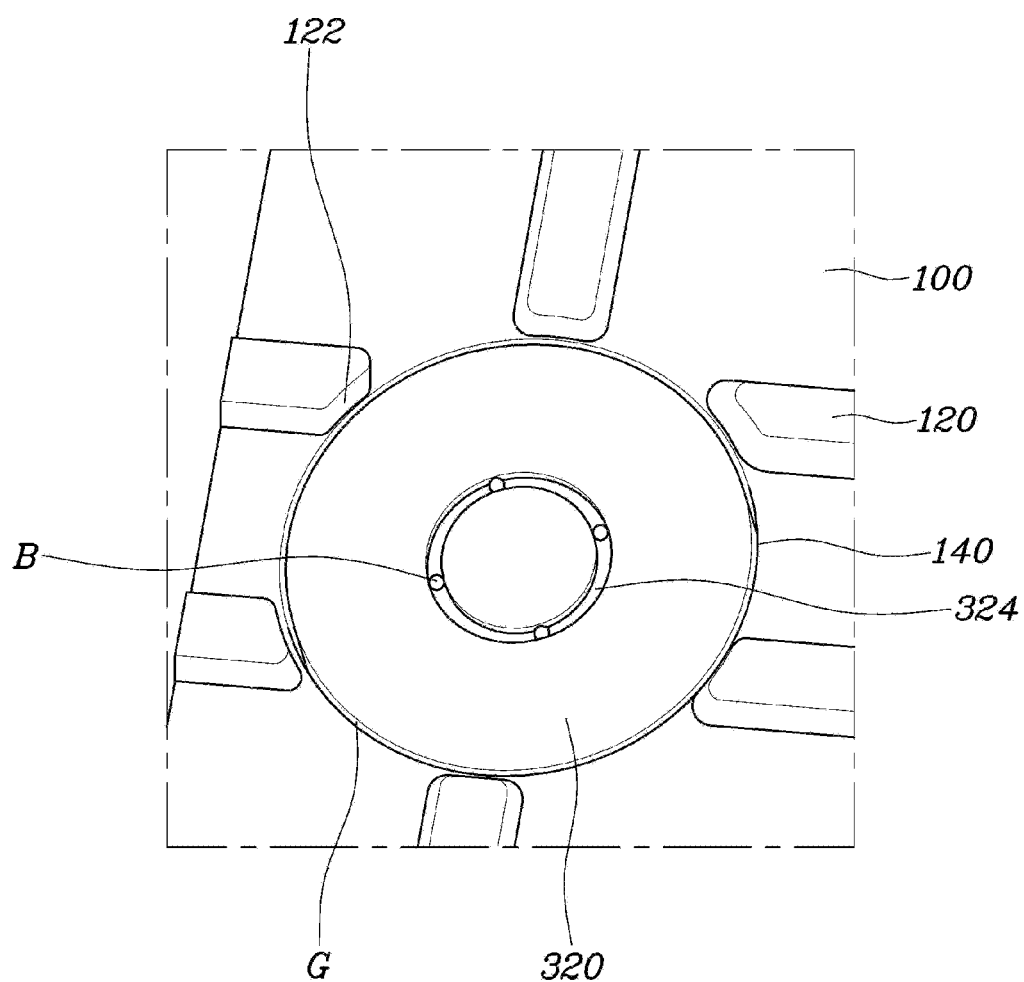
FIG. 6 is a view illustrating a state in which a floor panel of a seat mounting unit for a vehicle and a bottom plate of a seat mounting part are coupled according to an exemplary embodiment of the present disclosure.

Specifically, the seat mounting part 300 may include the bottom plate 320 coupled to the aperture 140 of the floor panel 100 and a top plate 340 fastened to the bottom plate 320 to rotate relatively with respect to the bottom plate 320 and allowing a lower portion of the seat to be coupled thereto. The top plate 340 of the seat mounting part 300 may include an upper surface portion 342 to which the seat is coupled and the side surface portion 344 overlapping the side surface 122 of the cut end portion of the load path member 120. Since the bottom plate is fixed to the floor panel 100, the top plate 340 may overlap the load path member 120 and rotate with respect to the relatively fixed bottom plate 320. To allow a rotational motion to be smoothly performed between the top plate and the bottom plate, a bearing B may be disposed between the top plate 340 and the bottom plate 320 of the seat mounting part 300 as illustrated in FIG. 6, and an annular guide recess 324 allowing the bearing B to be seated to be movable may be formed on the bottom plate as illustrated in FIGS. 4 and 6.

Figure 5:
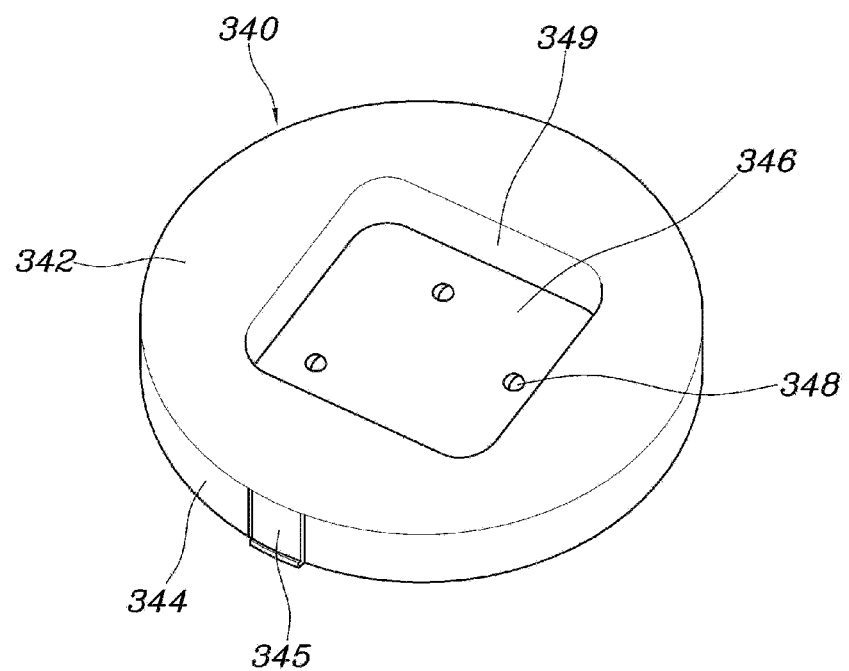
FIG. 5 is a view illustrating a top plate of a seat mounting part of a seat mounting unit for a vehicle according to an exemplary embodiment of the present disclosure.

As illustrated in FIG. 5, the top plate 340 of the seat mounting part 300 may include the upper surface portion 342 to which the seat is coupled and the side surface portion 344 that extends downwards along the edge of the upper surface portion and overlaps the side surface 122 of the cut end portion of the load path member 120. A support recess 349 indented downwards may be formed in a portion of the upper surface portion 342 of the top plate 340, and the bearing B may be disposed between a bottom surface 346 of the support recess 349 and the bottom plate 320. In other words, the support recess 349 may be formed to be indented downwards at the center of the top plate 340, and in particular, the support recess 349 may be formed to have a depth that allows the bottom surface 346 thereof to be matched to an upper surface of the bottom plate 320. In addition, since a plurality of ball type bearings B are installed between the bottom surface of the support recess 349 and the bottom plate facing each other, rotation between the top plate 340 and the bottom plate 320 may be smoother, and although a load of the seat acts, the top plate, the top plate 340 is not sloped to one side and rotate on one plane.

To uniformly support the top plate 340, bearing recesses 348, into which the bearings B are inserted, may be formed on the bottom surface 346 of the support recess 349 of the top plate 340 based on positions of the bearings B. The bearing recesses 348 may be formed at a predetermined interval or at an interval of about 90° to uniformly support the top plate 340 from each direction, and the annular guide recess 324 having a concept of a track allowing the bearings B to be turned may be formed on the bottom plate 320.

Further, to fix and rotate the top plate 340, the bottom plate of the seat mounting part 300 may have a circular shape. The edge of the bottom plate 320 of the seat mounting part 300 and the edge of the aperture 140 of the floor panel may be spaced apart from each other by a predetermined distance to form an annular guide slit G. To correspond thereto, a guide tap 345 may be formed at a lower end of the top plate 340 of the seat mounting part 300 and inserted into the guide slit G to be guided during rotation. In other words, as illustrated in FIG. 5, a portion of the side surface portion of the top plate may be cut and bent outwards, and the guide tap 345 may be formed at a lower end of the bent end portion. Particularly, the guide tap 345 may be formed of a metal and slightly elastically deformed.

Thus, when the top plate 340 and the bottom plate 320 are coupled, the guide tap 345 may be elastically inserted into the top plate 340 and inserted into the guide slit G between the top plate 340 and the bottom plate 320. When assembling of the top plate 340 and the bottom plate 320 is completed, the guide tap 345 may be elastically restored to the outside again to be caught in the guide slit G, and in this state, the guide tap 345 may slide in the guide slit G without being released therefrom. Accordingly, the top plate 340 may be prevented from being released from the bottom plate 320 and simultaneously may rotate thereon.

As illustrated in FIG. 4, a fixing tap 322 extends outwards from a portion of an edge of the bottom plate 320 of the seat mounting part 300. The fixing tap 322 may be fixed to the floor panel 100 through welding, or the like, as illustrated in FIG. 6, and accordingly, the guide slit G may have a ring shape, but is divided by the fixing tap 322. The guide tap 345 may slide along the guide slit G and may be stopped at the fixing tap 322. In other words, the guide tap 345 may slide only within the range of the guide slit G divided by the fixing tap 322. The fixing tap 322 may be configured to fix the bottom plate 320 of the seat mounting part 300 to the floor panel 100 and adjust a rotation radius of the top plate 340 of the seat mounting part 300. The rotation range of the seat may be variously limited by providing a plurality of fixing taps 322.

Meanwhile, the support recess 349 may have a quadrangular, triangular, or circular cross-sectional shape. In FIG. 5, the support recess 349 is illustrated to have a quadrangular cross-sectional shape, but in some cases, the cross-sectional shape of the support recess 349 may be a triangular or circular shape, and it may be varied based on the degree and characteristics of a collision load of each vehicle and shape and arrangement of the load path member 120.

Figure 8:
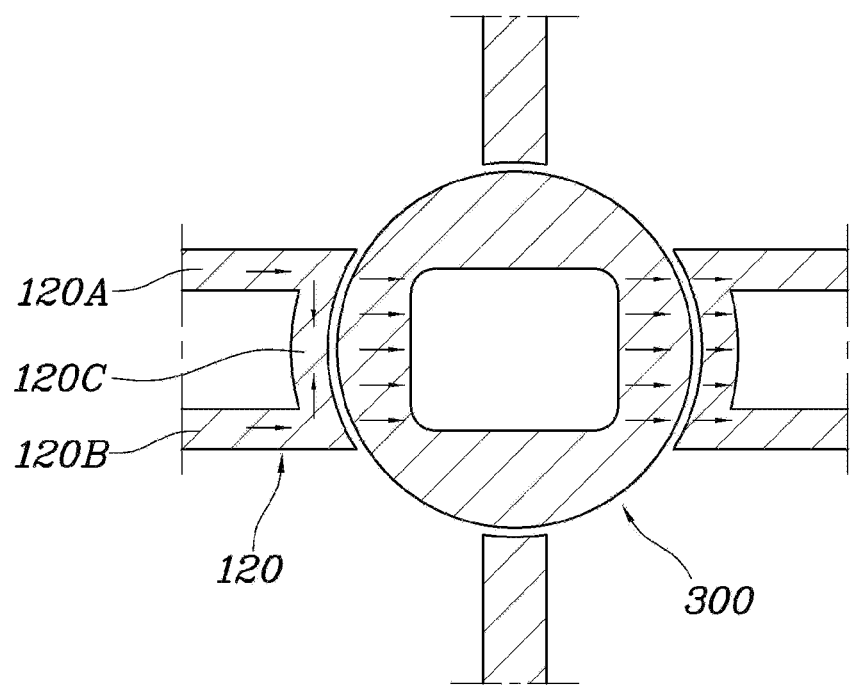
FIGS. 8 to 9 are views illustrating a path along which a collision load is transmitted through a seat mounting unit for a vehicle according to another exemplary embodiment of the present disclosure.
Figure 9:
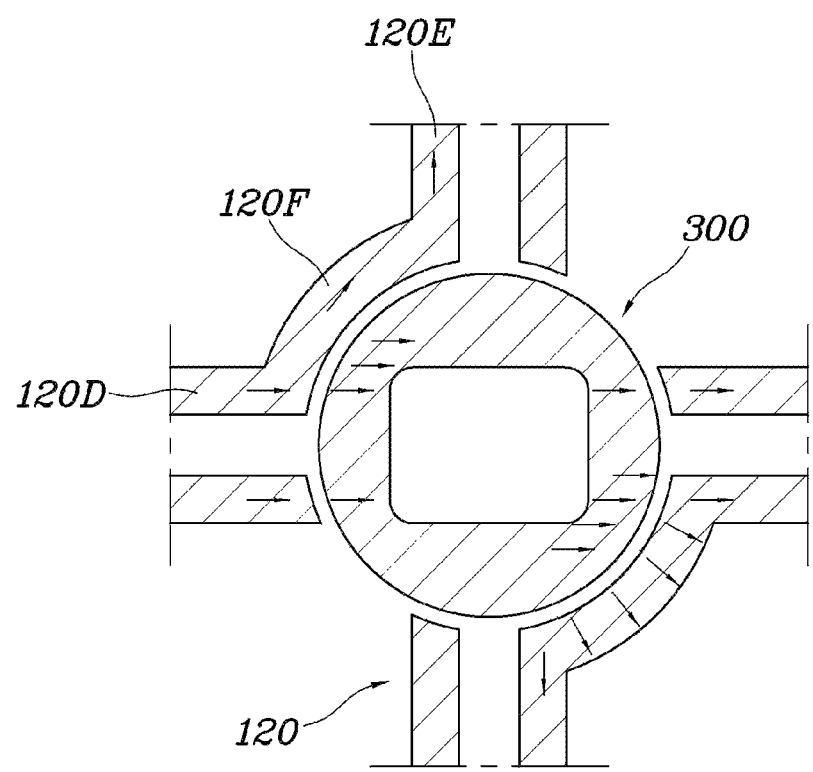

FIGS. 8 to 9 are views illustrating paths along which a collision load is transmitted through a seat mounting unit for a vehicle according to another exemplary embodiment of the present disclosure. In the case of FIG. 8, the load path member 120 may include a plurality of load path members 120A and 120B that extend in parallel in a predetermined direction. The plurality of load path members 120 extending in parallel may be connected to each other in cut end portions to form a connecting portion 120C, and a side surface of the connecting portion 120C may overlap the side surface portion of the seat mounting part 300 in a height direction. Accordingly, collision loads introduced to the respective load path members 120 may be shared by the connecting portion 120C, and since the connecting portion 120C transmits the collision loads to the seat mounting part 300, an area for transmitting the collision loads may be further increased and the collision loads may be reliably transmitted.

In the case of FIG. 9, the load path member 120 may include a first path member 120D that extends in a first direction and a second path member 120E that extends in a second direction. Particularly, cut end portions of the first path member 120D and the second path member 120E may be connected to each other to form a connecting portion 120F, and a side surface of the connecting portion 120F may overlap the side surface portion of the seat mounting part 300 in the height direction. Accordingly, an area for transmitting a collision to the seat mounting part 300 may be increased and a load introduced to the first path member 120D may be transmitted to the second path member 120E, whereby the collision load may be spread and absorbed in various directions.

According to the seat mounting unit for a vehicle of the present disclosure, the seat of the vehicle may be rotated and impact may be sufficiently absorbed in the event of a vehicle collision in autonomous vehicles. In particular, the rotatable seat may be directly applied without modifying the existing load path structure, and the existing load path may be formed as more various paths through installation of the rotatable seat.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A seat mounting unit for a vehicle, comprising:
   a floor panel having a panel shape that forms a floor surface of the vehicle and includes a load path member that protrudes from the floor surface and extends in a predetermined direction, the load path member being partially cut and divided through cut portions; and
   a seat mounting part positioned at the cut portions of the load path member, rotatably installed on the floor panel, and including a side surface portion having a predetermined height, the side surface portion overlapping a side surface of a cut end portion of the load path member in a height direction.

2. The seat mounting unit of claim 1, wherein a side surface of the cut end portion of the load path member has a shape of a closed surface.

3. The seat mounting unit of claim 1, wherein the floor panel has a circular aperture formed at a location that corresponds to the cut portion of the load path member.

4. The seat mounting unit of claim 3, wherein the seat mounting part includes a bottom plate coupled to the aperture of the floor panel and a top plate fastened to the bottom plate to rotate relatively with respect to the bottom plate and allowing a lower portion of a seat to be coupled thereto.

5. The seat mounting unit of claim 4, wherein the top plate of the seat mounting part includes an upper surface portion allowing the seat to be coupled and a side surface portion extending downwards along the edge of the upper surface portion and overlapping a side surface of the cut end portion of the load path member.

6. The seat mounting unit of claim 4, wherein the bottom plate of the seat mounting part has a circular shape, an edge of the bottom plate of the seat mounting part and an edge of the aperture of the floor panel are spaced apart from each other by a predetermined distance to form an annular guide slit, and a guide tap is formed at a lower end of the top plate of the seat mounting part and inserted into the guide slit to be guided during rotation.

7. The seat mounting unit of claim 6, wherein a fixing tap extends outwards from a portion of the edge of the bottom plate of the seat mounting part, the fixing tap is fixed to the floor panel, and the guide tap slides along the guide slit and is stopped at the fixing tap.

8. The seat mounting unit of claim 4, wherein a bearing is disposed between the top plate and the bottom plate of the seat mounting part, and an annular guide recess is formed on the bottom plate to allow the bearing to be seated to move thereon.

9. The seat mounting unit of claim 4, wherein the top plate of the seat mounting part includes:
   an upper surface portion allowing the seat to be coupled thereto; and
   a side surface portion extending downwards along the edge of the upper surface portion and overlapping the side surface of the cut end portion of the load path member,
   wherein a support recess indented downwards is formed at a portion of the upper surface portion of the top plate, and the bearing is disposed between a bottom surface of the support recess and the bottom plate.

10. The seat mounting unit of claim 9, wherein a cross-section of the support recess has a quadrangular, triangular, or circular shape.

11. The seat mounting unit of claim 1, wherein a plurality of load path members are provided and extend in parallel in a predetermined direction, the plurality of load path members are connected to each other in cut end portions thereof to form a connecting portion, and a side surface of the connecting portion overlaps the side surface portion of the seat mounting part in a height direction.

12. The seat mounting unit of claim 1, wherein the load path member includes a first path member that extends in a first direction and a second path member that extends in a second direction, cut end portions of the first path member and the second path member are connected to each other to form a connecting portion, and a side surface of the connecting portion overlaps the side surface portion of the seat mounting part in a height direction.

* * * * *